July 26, 1927.
F. M. SLATER
1,637,203
BLOWING DEVICE
Filed Oct. 26, 1926
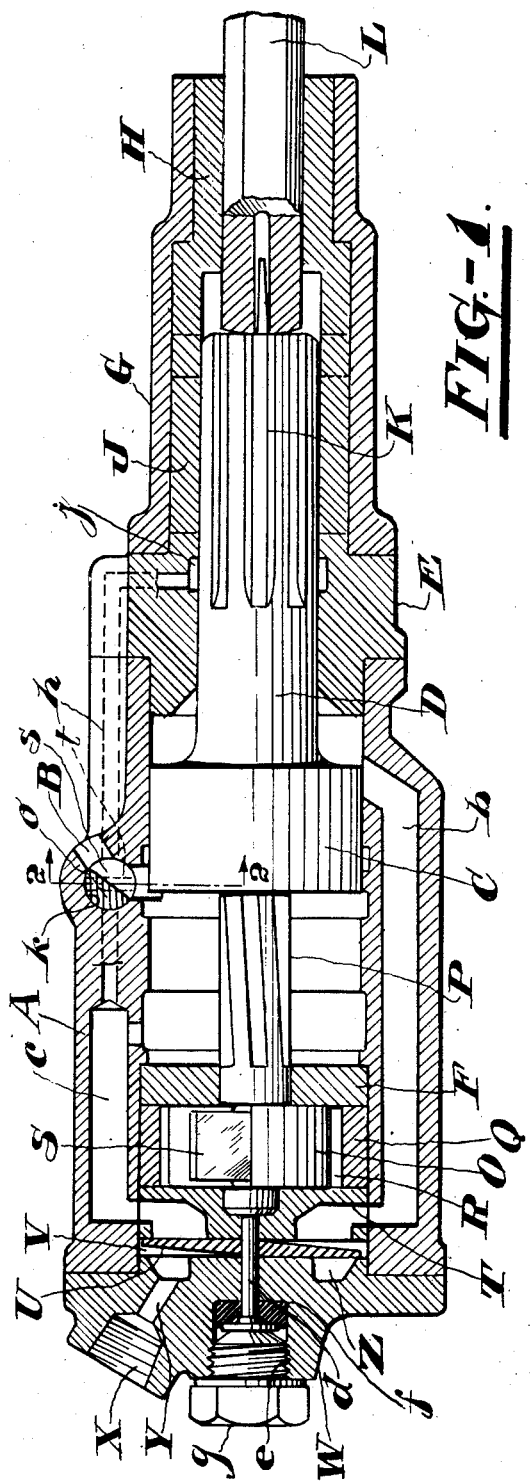
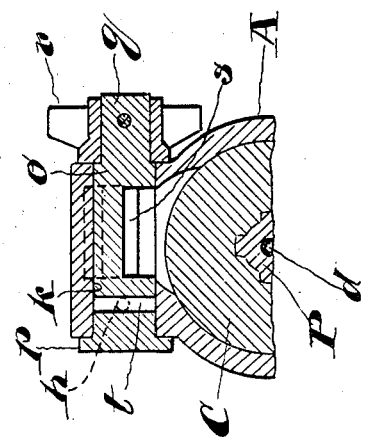
INVENTOR.
Fred M. Slater
BY
HIS ATTORNEY Patented July 26, 1927.

1,637,203

UNITED STATES PATENT OFFICE.

FRED M. SLATER, OF EASTON, PENNSYLVANIA, ASSIGNOR TO INGERSOLL-RAND COMPANY, OF JERSEY CITY, NEW JERSEY, A CORPORATION OF NEW JERSEY.

BLOWING DEVICE.

Application filed October 26, 1926. Serial No. 144,335.

This invention relates to rock drills, but more particularly to a blowing device for a fluid actuated rock drill of the hammer type.

One object of the invention is to insure an uninterrupted flow of pressure fluid under full line pressure into the drill hole for removing the cuttings therefrom whenever the means ordinarily relied upon for cleaning the drill hole fail or prove inadequate.

Other objects will be in part obvious and in part pointed out hereinafter.

The invention consists of the combination of elements, features of construction and arrangement of parts substantially as hereinafter described and more particularly pointed out in the appended claims and illustrated in the accompanying drawings, in which Figure 1 is a longitudinal sectional elevation of a rock drill having the invention applied thereto, and Figure 2 is a transverse sectional view taken through Figure 1 on the line 2—2 looking in the direction of the arrows.

Referring to the drawings, the invention is shown embodied in a rock drill having a cylinder A provided with a free exhaust port B. A hammer piston C is disposed in the cylinder A and has a reduced forward extension D which cooperates slidably with a front cylinder washer E forming in this instance a closure for the front end of the cylinder. The rearward end of the cylinder A is closed by a back cylinder washer F disposed in this instance within the cylinder.

Supported by the front cylinder washer E is a front head G which serves as a housing for the chuck mechanism comprising in this instance a chuck H interlocked with a chuck nut J. The chuck nut in turn is interlocked slidably with flutes K formed in the piston extension D to impart rotary movement of the piston to the chuck parts for rotating a hollow drill steel L extending into the chuck H to receive the blows of the hammer piston C.

In addition to forming a closure for the rearward end of the cylinder, the back cylinder washer also acts as a seat for a rotation head O of a rifle bar P which extends through the back cylinder washer F and cooperates slidably with the piston C in the usual manner. Encircling the rotation head O is a ratchet ring Q having inwardly extending teeth R to engage spring pressed pawls S carried by the rotation head O for preventing rotation of the rifle bar with the piston during one of the strokes of the piston. Disposed in the rearward end of the cylinder A and seated on the rotation ratchet Q is a cylindrical block T which acts as a seat for an oscillatory plate distributing valve U in a valve chamber V, the valve chamber V in this instance being formed by the block T and a back head W seated on the rearward end of the cylinder.

Pressure fluid for operating the drill may be conveyed to a connection X in the back head W from a suitable source of supply. In this instance a passage Y is formed in the back head for conveying the pressure fluid from the connection X to an annular supply chamber Z in the back head W.

Pressure fluid thus conveyed to the supply chamber Z is distributed by the valve U which controls in this instance front and rearward inlet passages $b$ and $c$ leading to the front and rearward ends respectively of the cylinder.

Suitable means are provided for conveying cleansing liquid such as water through the rock drill and through the drill steel L to the drill hole for washing the cuttings therefrom. To this end a water tube $d$ is extended coaxially through the valve, the rifle bar and the piston to a point in the rearward end of the drill steel L. The rearward end of the water tube $d$ extends into a recess $e$ in the back head W and is sealed by a packing $f$ which encircles the water tube.

A water plug $g$ is screwed into the recess $e$ for sealing the outer end of the recess and for compressing the packing $f$.

Usually in rock drills having pistons of the type illustrated in the drawings, a portion of pressure fluid admitted to the front end of the cylinder passes through the flutes and through the hollow drill steel to augment the pressure of the cleansing water which is not at all times of sufficient value to remove the cuttings from the drill hole. The supply of pressure fluid admitted to the drill hole in this manner, however, is uncertain and at times is not sufficient to produce the desired results. In consequence, the cuttings in the drill hole will form a collar rearwardly of the drill bit and will hinder the rotation of the drill steel. The present invention aims to overcome this undesirable condition and, to this end, a conduit $h$ is formed through the cylinder A and through the front cylinder washer E to communicate with an annular internal groove $j$ in the front cylinder washer E.

Formed transversely through the cylinder A to intersect the exhaust port B and the conduit $h$ is a bore $k$ in which is disposed a rotatable throttle valve $o$. The throttle valve $o$ is preferably of cylindrical form throughout its length and carries at one end an integral flange $p$ which abuts the side of the cylinder for holding the throttle valve against endwise movement in one direction. At the opposite end of the throttle valve $o$ is formed a reduced extension $q$ on which is mounted a button $r$ for manipulating the said throttle valve.

In the present instance the throttle valve is provided with a recess $s$ in one side and this recess forms a part of the exhaust port B when the throttle valve is in its open position. A passage $t$ in the throttle valve $o$ is adapted to register with the conduit $h$ when the throttle valve is rotated to the position for closing the exhaust port B.

During the operation of the drill, whenever conditions in the drill hole are such that the ordinary means for removing the cuttings therefrom prove inadequate, the throttle valve $o$ may be rotated to close the exhaust port B, thus preventing the exhaust of the air admitted into the cylinder. When the throttle valve $o$ is rotated to close the exhaust port B, the passage $t$ will be moved into registry with the conduit $h$ so that a constant stream of pressure fluid will flow from the inlet passage $c$ through the conduit $h$, the flutes K and through the drill steel L into the drill hole.

After the drill hole has been satisfactorily cleansed the throttle valve $o$ may again be rotated to open the exhaust port B and close the conduit $h$ and the drill will then again function in its normal manner.

In the drawings the distributing valve U is shown in position to close the inlet port $c$, this being one of its limiting positions. However, when the throttle valve $o$ is rotated to close the exhaust port B the air acting on the opposite end of the valve will tip the valve to close the front inlet passage $b$ so that a constant flow of pressure fluid to the inlet passage $c$, and consequently through the conduit $h$, will be assured during the blowing operation.

A desirable advantage obtained by means of the present invention is that when the invention is applied to a rock drill of the type illustrated, the valve may assume a balanced position during the blowing operation so that pressure fluid may be admitted to both ends of the cylinder, thus causing the piston to reciprocate slightly. As a result, the drill steel will be rotated somewhat to assist in loosening any cuttings which may accumulate around the drill bit.

I claim:

1. In a fluid actuated rock drill, the combination of a cylinder having inlet passages and a free exhaust port, a hammer piston in the cylinder controlling the exhaust port, a fluted extension on the hammer piston, a valve chamber, a valve in the chamber controlling the inlet passages, a conduit in the cylinder leading from an inlet passage to communicate with the flutes of the extension forwardly of the cylinder, and means in the cylinder for closing the exhaust port and for simultaneously permitting an uninterrupted flow of pressure fluid through the conduit and through the fluted extension.

2. In a fluid actuated rock drill, the combination of a cylinder having front and rearward inlet passages and a free exhaust port, a hammer piston in the cylinder controlling the exhaust port, a fluted extension on the piston, a valve chamber, a valve in the chamber controlling the inlet passages, a conduit leading from the rearward inlet passage to communicate with the fluted extension forwardly of the cylinder, a throttle valve extending through the exhaust port and the conduit rotatable to one position for closing the conduit and opening the exhaust port, said throttle valve also being rotatable to another position for closing the exhaust port and simultaneously permitting an uninterrupted supply of pressure fluid through the conduit and through the fluted extension.

In testimony whereof I have signed this specification.

FRED M. SLATER.